United States Patent [19]
Klein et al.

[11] Patent Number: 6,008,457
[45] Date of Patent: *Dec. 28, 1999

[54] ASSEMBLY FOR STEERING COLUMN SWITCH WITH SPIRAL SPRING

[75] Inventors: Rudolf Klein, Lauffen a.N.; Salvador Cristofaro, Schlat; Walter Hecht, Bietigheim-Bissingen, all of Germany

[73] Assignee: ITT Automotive Europe, GmbH, Frankfurt, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,319
[22] PCT Filed: Apr. 8, 1995
[86] PCT No.: PCT/EP95/01298
  § 371 Date: Sep. 5, 1997
  § 102(e) Date: Sep. 5, 1997
[87] PCT Pub. No.: WO95/32877
  PCT Pub. Date: Dec. 7, 1995

[30] Foreign Application Priority Data

May 26, 1994 [DE] Germany ............... 44 18 329

[51] Int. Cl.⁶ ............... H01H 9/00; H01R 39/00
[52] U.S. Cl. ............... 200/61.54; 439/15
[58] Field of Search ............... 200/61.54, 61.55, 200/61.56, 61.57; 439/15, 164

[56] References Cited

U.S. PATENT DOCUMENTS

| | | |
|---|---|---|
| 4,422,699 | 12/1983 | Sakurai et al. . |
| 4,607,898 | 8/1986 | Reighard et al. ............... 339/3 S |
| 4,744,763 | 5/1988 | Suzuki et al. ............... 439/15 |
| 4,840,078 | 6/1989 | Shitanoki . |
| 4,919,620 | 4/1990 | Yamaguchi et al. ............... 439/15 |
| 5,061,195 | 10/1991 | Bolen . |
| 5,171,157 | 12/1992 | Bolen ............... 439/164 |
| 5,460,535 | 10/1995 | Bolen ............... 439/164 |
| 5,704,633 | 1/1998 | Durrani et al. ............... 280/728.2 |
| 5,714,727 | 2/1998 | Lecznar et al. ............... 200/61.54 |

FOREIGN PATENT DOCUMENTS

| | | |
|---|---|---|
| 0195831A1 | 3/1985 | European Pat. Off. . |
| WO9117592 | 11/1990 | European Pat. Off. . |
| 0520503A3 | 6/1992 | European Pat. Off. . |
| 0591730A1 | 9/1993 | European Pat. Off. . |
| 3040903C3 | 5/1981 | Germany . |
| 3427588A1 | 2/1986 | Germany . |
| 4004233A1 | 8/1990 | Germany . |
| 4231191A2 | 4/1993 | Germany . |
| 93 00 909 U1 | 4/1993 | Germany . |
| 4322879C1 | 10/1994 | Germany . |
| 4322443A1 | 1/1995 | Germany . |

OTHER PUBLICATIONS

English Translation of the International Preliminary Examination Report for International Appl. No. PCT/EP95/01298.
International (PCT) Search Report, International Application No. PCT/EP95/01298.
German Search Report, German Patent Application No. 19511693.3.

Primary Examiner—Corrine McDermott
Assistant Examiner—Michael J. Hayes
Attorney, Agent, or Firm—J. Gordon Lewis

[57] ABSTRACT

A steering column switch has a spiral spring which produces a rotatable contact between terminals that are rigidly arranged on the housing of the steering column switch and terminals on the rotatable steering wheel. The receptacle for the spiral spring is attained by integrally forming an open receptacle onto the switch housing, with said receptacle being closed by a cover that can be turned relative to the housing. Consequently, the spiral spring is integrated into the switch housing such that a separate spring housing is eliminated. Advantageous additional developments of the invention pertain to an additional locking part that rotationally locks the cover relative to the switch housing while the switch is stored. The locking part also makes it possible to turn the cover only relative to the switch housing once the steering wheel is attached to the steering column.

16 Claims, 8 Drawing Sheets

ASSEMBLY FOR STEERING COLUMN SWITCH WITH SPIRAL SPRING

BACKGROUND OF THE INVENTION

Many vehicles, in particular, motor vehicles, are provided with a steering wheel that acts upon the wheels (or a rudder, respectively) via a steering column and consequently makes it possible to steer the vehicle. In addition, a so-called steering column switch is usually arranged within the region of the steering column. The housing of the steering column switch is arranged stationary with respect to the vehicle housing. Such a steering column switch serves for actuating various electrically operated devices, e.g., the windshield wiper, the windshield washer, the lights, etc.

In addition, a contact is arranged on the rotatable steering wheel in order to provide easy access to a contact that triggers an acoustic warning device (e.g., the horn). This contact is connected to the warning device via the housing of the steering column switch. Since the electric connection between the warning contact and the housing of the steering column switch needs to be ensured over the entire service life of the vehicle, the connection between the warning contact and the housing of the steering column switch is realized by means of a so-called spiral spring. This particular measure also applies to the electric line that serves for triggering the airbag.

The spiral spring represents a cylindrical, coiled connecting line, one end of which is rigidly anchored to the housing of the steering column switch and the other end of which is connected to the rotatable warning contact, the airbag or another electrical device arranged on the steering wheel. Since the rotational movement of the warning contact is largely distributed over the individual windings of the spiral spring during the steering process, the relative movement of the individual sections of the spiral spring is comparatively small, i.e., the connecting wires are only subject to slight wear during the long service life of the vehicle.

One disadvantage of known spiral springs is that they are supplied by a special manufacturer in a separate housing, i.e., the spring housing must be connected (e.g., locked in place) to the housing of the steering column switch during the assembly of the vehicle.

SUMMARY OF THE INVENTION

The present invention aims to simplify the combination of the steering column switch and the electric connecting element that serves to connect the housing of the steering column switch to the electric device on the steering wheel and, in particular, to simplify the design as well as the assembly of the aforementioned combination.

The invention, in principle, consists of arranging the connecting element that is largely insensitive to a rotational movement of the electric device relative to the steering column switch as far as possible inside of the housing of the steering column switch. Due to this measure, a separate housing for the connecting element which subsequently must be connected to the housing of the steering column switch in an additional production step is eliminated. When assembling the steering column switch, the connecting element can be inserted into the steering column switch simultaneously with the individual components. According to the invention, a space that is open on one side is formed on the housing cover, the connecting element being inserted into this space and retained therein.

Although the invention can be used with all connecting elements that are directly installed into the housing of the steering column switch, a particular combination of characteristics is proposed for instances in which spiral springs are utilized. In this case, the spiral spring can be subsequently inserted into the receptacle of the switch housing. A particularly simple assembly is attained with the spiral spring being fastened to a cover that is locked together with the receptacle.

In order to protect the spiral spring from dirt and possible wear due to its contact with the steering column, an annular chamber is formed for the spiral spring, with the spiral spring being well protected from external influences inside of the annular chamber.

In a steering column switch with a closed chamber that is formed by a rotatable cover and the cover part of the switch, it may be desirable if the cover is selectively arranged in rotationally rigid fashion relative to the switch depending on the state of the switch. This characteristic pertains to instances in which the switch is delivered to the automobile manufacturer with the spiral spring situated in the cover chamber and the rotatable cover attached thereon. This measure prevents the spiral spring from being wound or unwound during the transport if the cover is turned, i.e., the function of the spiral spring is not impaired. However, the rotatability of the cover relative to the switch during the installation of the switch into the vehicle should be realized with simple means. This cannot be attained with a simple catch, in particular, if the tolerances occurring during the installation should be simultaneously taken into consideration.

To address this concern, a special locking part is provided. This locking part can assume different locking positions, depending on whether the switch is transported separately or installed into a motor vehicle. Even if only one cover with two locking positions that correspond to the state of the switch was provided, the change in position of the cover would simultaneously change the size of the chamber. This would, in turn, affect the guidance and retention of the spiral spring accommodated therein.

It is, in principle, conceivable for the locking part to assume two different locking positions depending on the state of the switch. In this case, the cover is held such that it is unable to rotate in one locking position, with the cover being able to turn relative to the switch cover in the second locking position. If the locking part needs to be elastically held in its locking position so as to compensate tolerances, the locking part is arranged in the cover and/or the switch housing in the direction of the rotational axis of the cover or the longitudinal axis of the steering column, respectively. According to this additional development, the spring tension is chosen such that it tends to press the locking part out of the switch housing. However, the locking part is simultaneously pulled into the locking position on the switch housing with the aid of locking means. This principle can be utilized for both locking positions of the locking part, i.e., in the position in which the cover cannot be turned as well as in the position in which the cover can be turned. However, it is also possible to utilize this principle only for the locking position of the locking part in which the locking part is unable to rotate.

A particularly simple alternative for locking the locking part is attained with elastic latches of the spring part which protrude into the interior of the housing and engage with corresponding projections of the switch housing serve as the locking means. In order to implement the locking process such that it is largely independent of the angular position of the cover relative to the switch housing, it is proposed to realize the projections in the form of a circumferential, essentially annular edge of the switch housing.

In order to prevent the cover from rotating, the cover is guided such that it cannot be turned relative to the locking part. This can be easily attained if the locking part can be displaced relative to the cover in the longitudinal direction of the cover, but not turned relative to the cover.

The easy rotatability of the cover relative to the switch housing is attained with the cover having a circumferential groove receiving a circumferential edge of the switch housing.

In order to simultaneously achieve an elastic holding of the cover in its rotary bearing independently of the position of the locking part, the spring is not supported on the switch housing directly, but rather via a section of the cover that lies within the region of the rotary bearing. The supporting force of the spring is simultaneously utilized as an elastic retention force for the rotary bearing of the cover.

It was already proposed previously to provide two locking positions for the locking part which correspond to the rotatable and the nonrotatable state of the cover.

However, in certain instances it may desirable to allow the rotation of the cover only if the steering column switch is assembled and the steering wheel is attached to the steering column. In this case, a second locking position is not necessary. The invention makes it possible to manipulate the locking part by attaching the steering wheel to the steering column and displacing the locking part against the prestress generated by the spiral spring. If it is ensured that the ends of the locking part lie within a region of the switch housing which is not protected against rotation relative to the locking part in the axial end position of the steering wheel, the locking part can be turned relative to the switch housing in this state such that the locking part does not impair the rotational movement of the cover relative to the switch housing. In this case, the cover is usually mechanically coupled to the steering wheel such that the cover follows the rotational movement of the steering wheel.

A simple protection against rotation that depends on the longitudinal position of the locking part is attained with radially (e.g., inwardly) protruding projections engaging with radially outward directed projections on the switch housing within the first locking region. These housing projections which extend in the longitudinal direction of the steering column do not extend into the region into which the projections of the locking hooks extend if the locking part is turned into a position in which is moved in its longitudinal direction, namely into the position in which the cover can be turned. In this case, a series of radial projections can be provided on the wall of the switch to prevent any rotation of the cover. However, it is also possible to provide only a few radially inward protruding projections that allow a rotation of the cover within a certain angular range, even in the rotationally secured position.

In order to protect the sensitive spiral spring from impact against the switch housing or the cover, respectively, the invention proposes providing at least one damping disk that dampens the movement of the spiral spring inside of the chamber.

DETAILED DESCRIPTION OF A PREFERRED EMBODIMENT

Figure 1:
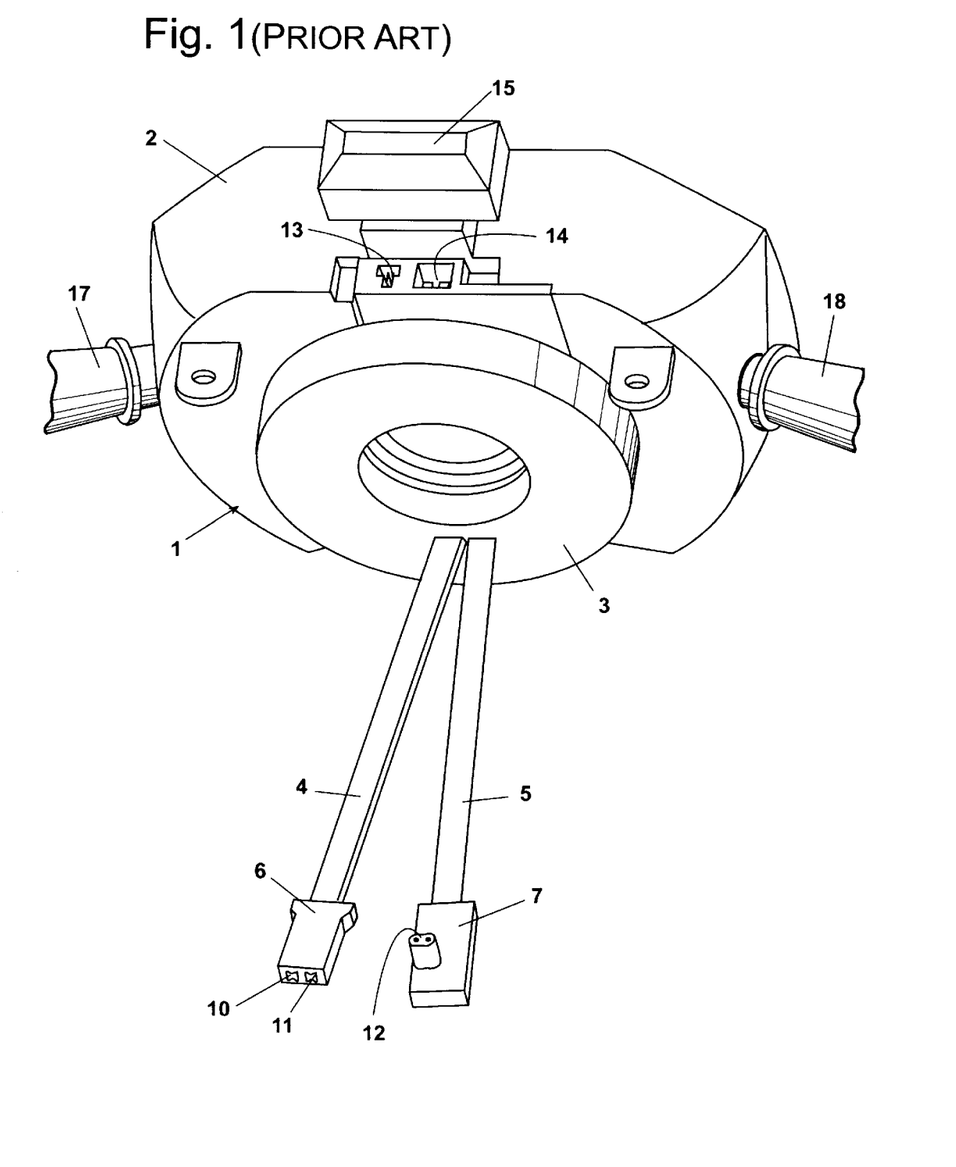
FIG. 1 is a perspective view of a steering column switch with a complete spiral spring inserted therein according to the state of art.

FIG. 1 shows a steering column switch 1, the switch housing 2 of which is fastened to a sleeve-shaped steering column (not shown) that is in turn rigidly connected to the chassis. A rotatable steering rod, also not shown, extends through the steering column, with a steering wheel (not shown) fastened to the end of the steering rod which faces the driver. The closed spring housing 3 that is arranged in the switch housing 2 such that it can be turned relative to the switch housing is rotatably connected to the steering rod or the steering wheel, respectively.

The ends 4, 5 of two lines protrude from the spring housing 3. Plug connectors 6, 7 are inserted into receptacles (not shown) fastened to the steering wheel and are arranged on the ends of the two lines. The plug connectors comprise contact pairs 10, 11, 12 that lead to switches on the steering wheel and serve for triggering the airbag (contact pair 12) or the horn (contact pair 11) or for operating a radio (contact pair 10).

During a rotational movement of the steering wheel, the plug connectors 6, 7 that are inserted into the steering wheel as well as the switch housing 3 that is connected to the steering rod follow the movement of the steering wheel.

The other end of the spiral spring is connected to terminals 13, 14, 15 with said terminals as well as the switch housing 2 being stationary relative to the chassis of the vehicle.

A hazard light switch as well as actuating levers 17, 18 (shown cut away) for actuating the windshield wiper/windshield washer system or the lights, respectively, are additionally fastened to the housing.

One disadvantage in the construction according to FIG. 1 can be seen in the fact that the closed spiral spring housing 3 must be fastened to the switch housing 2. The closed housing 3 represents an expenditure that can be eliminated with the aid of the invention.

Figure 2:
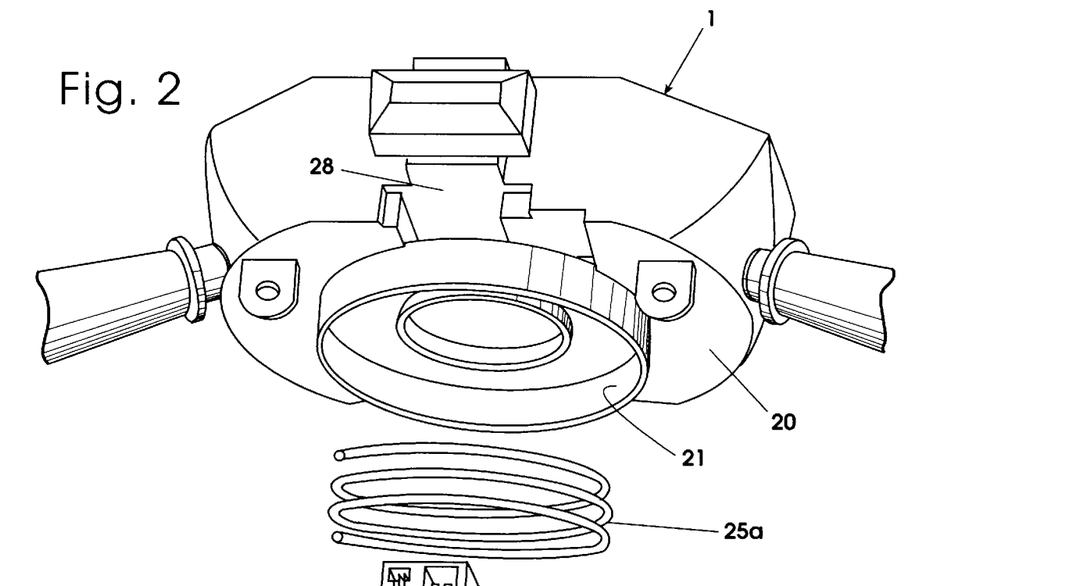
FIG. 2 is a perspective view of a steering column switch with a chamber that is integrally cast onto the housing.

FIG. 2 shows an embodiment of a modified steering column switch 1 according to the invention. A first or outer wall 21 that essentially forms the outer surface of a cylinder is situated on the cover part 20 of the steering column switch. A second or inner wall 22 that forms the outer surface of a second cylinder is integrally formed onto the cover part 20. In this case, the second cylinder has a smaller radius than the first cylinder that forms the first wall 21. Consequently, an annular cover chamber 23 is integrally formed onto the cover part 20. The inner wall 22 of this cover chamber limits the opening 24 in the switch housing 2, from which the steering column protrudes.

Figure 3:
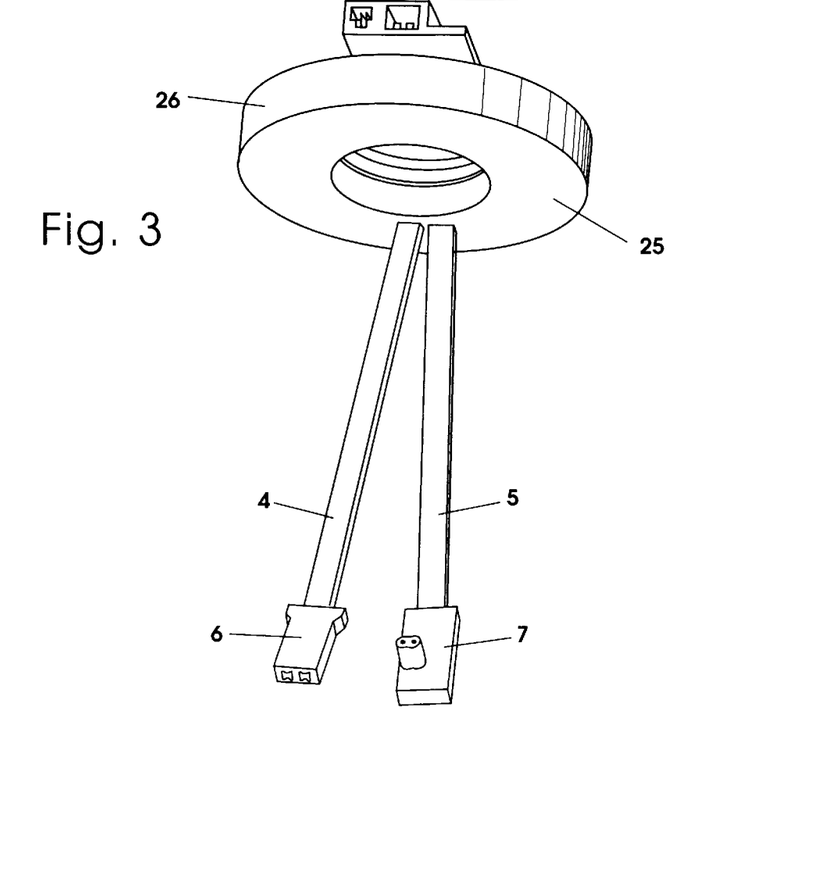
FIG. 3 is a perspective view of a spiral spring unit to be inserted into the chamber according to FIG. 2.

FIG. 3 shows the cover 25 of the cover chamber 23. This cover has the shape of an annular chamber (annular hollow space of the cover) as is also the case with the cover chamber 23. In this case, the side wall 26 extends coaxially to the first wall 21, inside or outside of the first wall, and is arranged in the switch housing 2 such that it can be turned relative to the aforementioned first wall. The spiral spring 25*a* in FIG. 3 ends in a plug connector 27 on its end situated opposite to the steering column. This plug connector can be inserted, for example, locked in place, in a recess 28 of the switch housing 2.

It is obvious that the invention makes it possible to realize the design of the housing cover 25 for the spiral spring much easier because it is no longer closed, but rather represents an open annular chamber.

Figure 4:
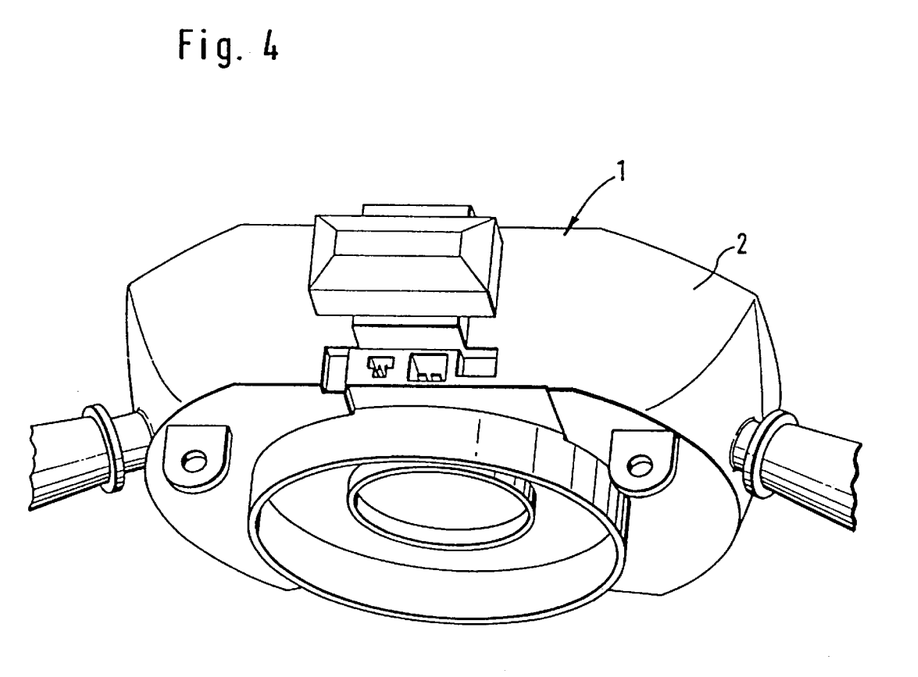
FIG. 4 is a perspective view of a steering column switch with a chamber and inserted contacts.

FIG. 4 shows a second embodiment of the invention in which the plug connector 27 according to FIG. 3 is integrated into the housing 2 of the steering column switch 1. In other respects, the design of the steering column switch according to FIG. 2 does not differ from that according to FIG. 4.

Figure 5:
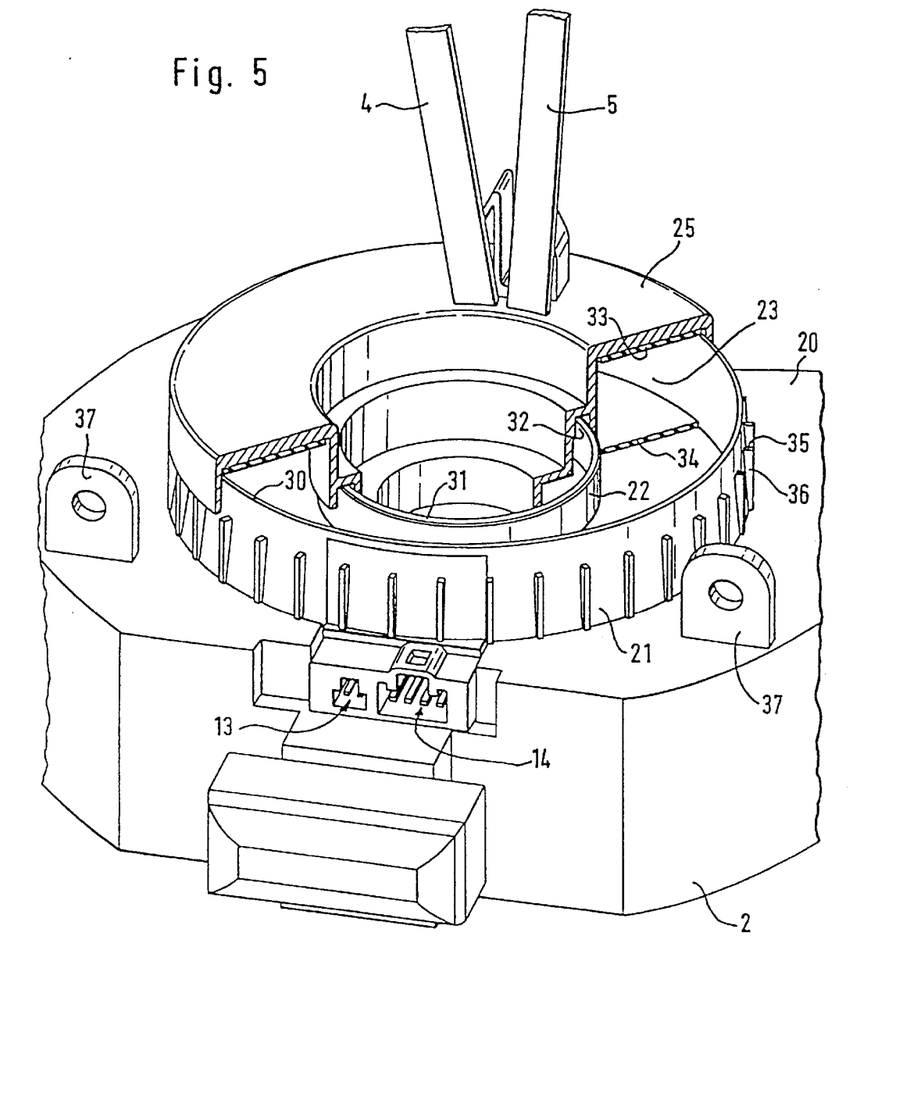
FIG. 5 is a perspective view of a schematic representation of a cover that is rotatably arranged on two annular walls of the switch housing.

FIG. 5 shows a cover 25 that forms a closed cover chamber 23 in cooperation with the cover part 20 of the switch housing 2. The previously described spiral spring 25*a* in this figure is arranged in the cover chamber 23. The end of the spiral spring 25*a* which rotates with the steering wheel is connected to the ends 4, 5 of the two lines, with the other end that does not turn with the steering column ending in stationary terminals 13, 14 as described previously. FIG. 5 also shows that the outer wall 21 as well as the inner wall 22 comprise annular edges 30, 31. The cover 25 is rotatably fixed to these edges. In this case, the cover is protected from carrying out excessive radial movement by means of a circumferential groove 32 on the circumferential edge 31.

The rotational movement of the cover 25 relative to the circumferential edge 30 can be additionally simplified by means of an annular damping disk 33 that simultaneously dampens the movement of the spiral spring situated in the cover chamber 23 and consequently protects this spring during its movement. This also applies to the second damping disk 34 that is inserted into the base of the cover chamber 23. The face surfaces 35 of the ribs 36 that are uniformly distributed around the outer surface of the first wall 21 provide a comparatively small friction surface and vertically support the outer edge of the cover 25 shown in FIG. 5. The eyelets 37 on the housing of the switch 2 serve for fastening purposes.

Figure 6:
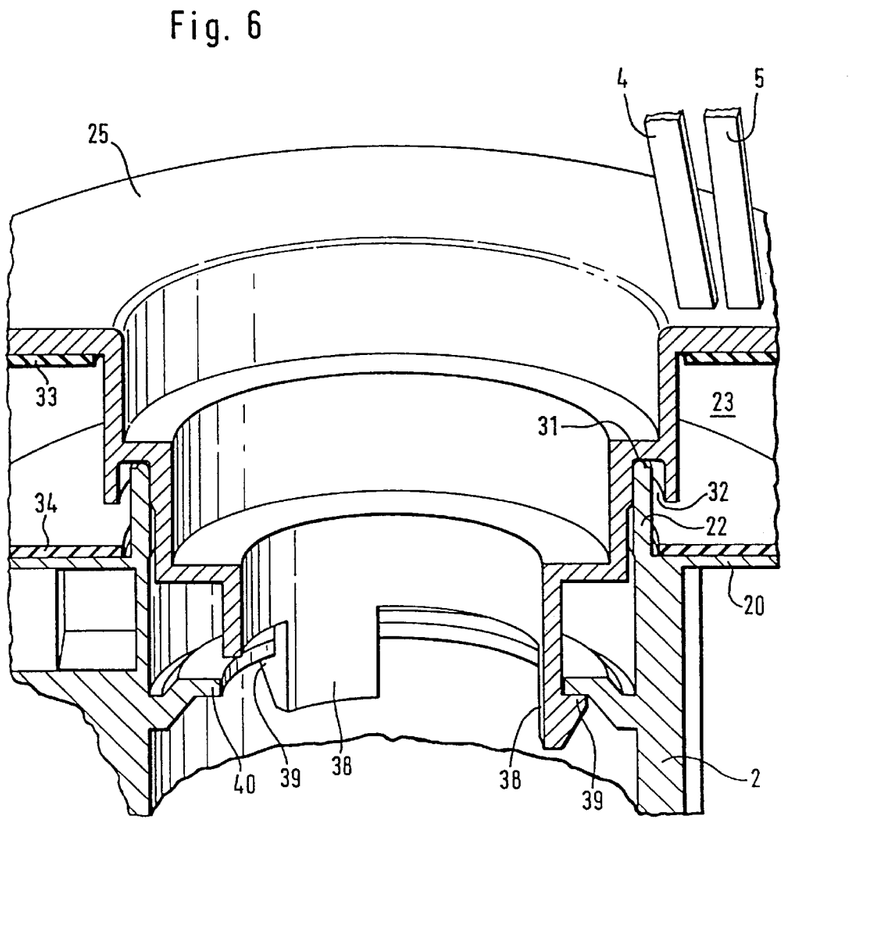
FIG. 6 is a combined perspective-sectional view of the rotatable bearing and the locking arrangement of the cover according to FIG. 5.

FIG. 6 shows a schematic representation of a detail of the cover according to FIG. 5 as well as the sectioned switch housing 2. In addition, FIG. 5 shows a detailed representation of the design of the end face of the circumferential edge 31 which is undulated in the shape of a sector of a circle so as to attain a line contact between the cover 25 and the wall 22 instead of a two-dimensional contact.

The cover 25 additionally comprises elastic legs 38 that engage behind a circumferential console 40 with locking hooks 39 and consequently hold the cover 25 in place relative to the switch housing 2, axially as well as radially.

In this case, the axial fixation is produced with locking hooks 39 and the circumferential groove 32. However, the radial fixation of the cover 25 relative to the switch housing 2 is attained due to the contact between the switch cover and the second wall 22 as well as the contact between the elastic legs 38 and the end face of the console 40.

In this case, the cover is arranged such that it can be turned relative to the switch housing 2 and locked in the desired position. The configuration proposed in FIGS. 5 and 6 is, however, not arranged elastically in the rotatable bearing 31, 32.

Figure 7:
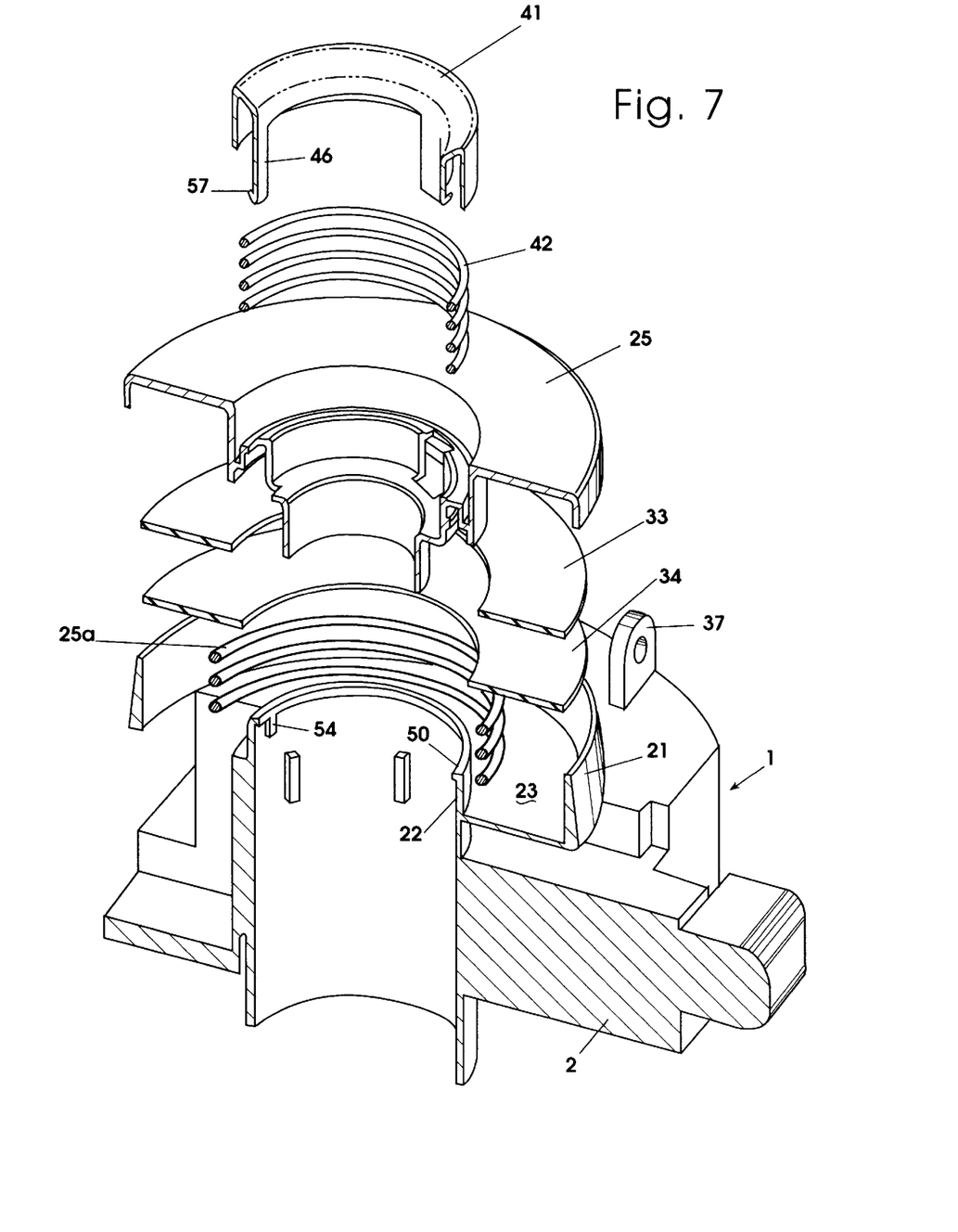
FIG. 7 is an exploded sectional view of a steering column switch that is provided with a special locking part.

FIG. 7 shows another, different embodiment in which the cover 25 is locked relative to the housing 2 of the switch 1 by means of a locking part 41. In the assembled state, the spiral inner spring 42 prestresses the locking part 41 relative to the switch housing such that the spring 42 tends to press the locking part 41 out of the housing 2. The inner spring 42 acts upon the locking part 41 with its upper end shown in FIG. 7, with the lower end of the spring acting upon the switch housing 2.

Figure 8:
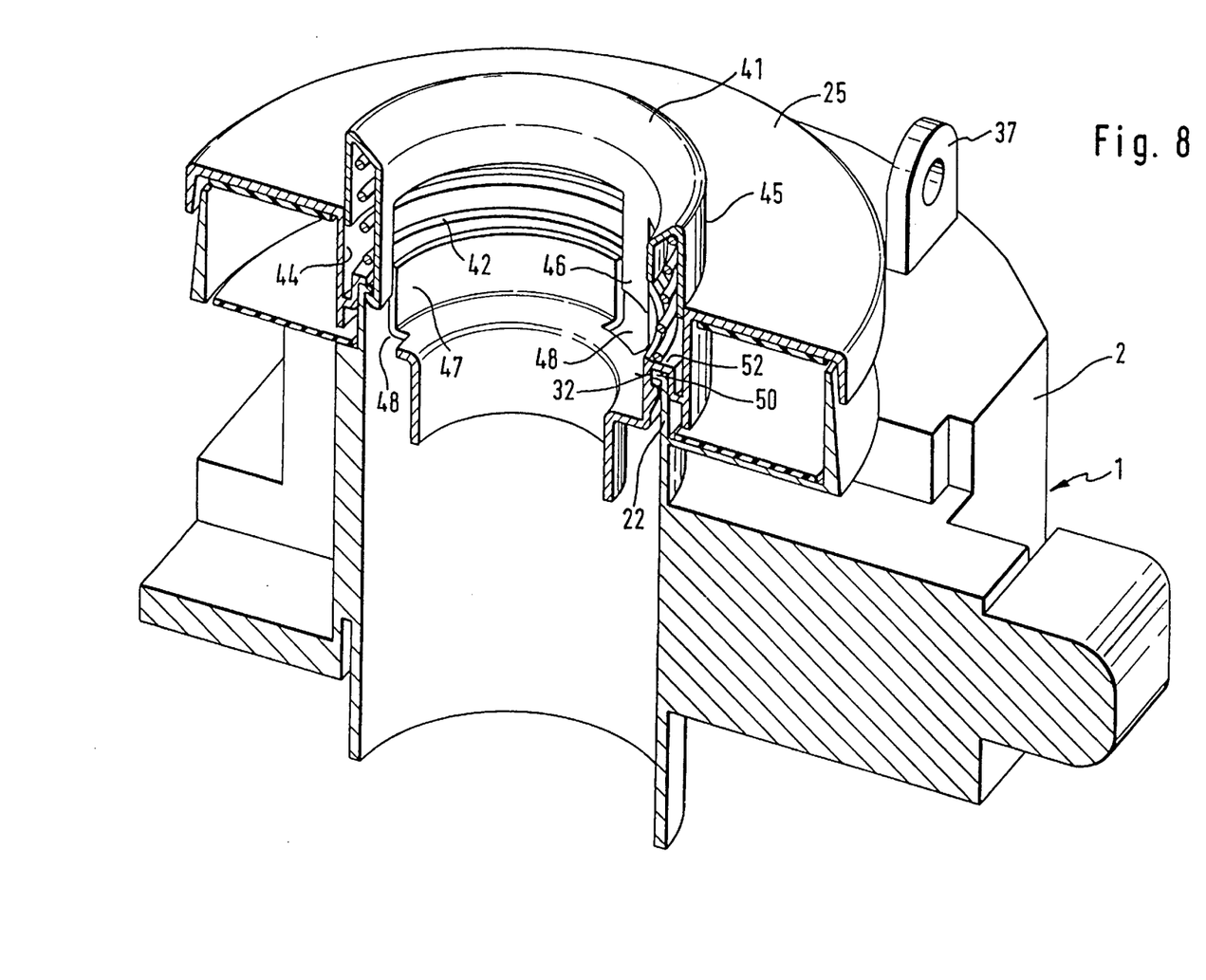
FIG. 8 is a combined perspective sectional detail of the steering column switch with a chamber for the spiral spring according to FIG. 7, in the assembled, rotationally locked state.

FIG. 8 shows the steering column switch 1 with a closed chamber for the spiral spring in the assembled state. FIG. 8 additionally shows the locking part 41 in a position in which the cover 25 is protected against rotating relative to the switch housing 2. One can easily ascertain that the circumferential groove 32 of the cover 25 rests on the inner wall 22 in rotatable fashion as described previously with reference to FIGS. 5 and 6, with the inner wall 22 being provided with a circumferential, radial projection 50 on its upper end shown in FIG. 8. This projection in cooperation with a corresponding projection on the side wall of the groove 32 makes it possible to lock the cover 25 relative to the inner wall 22, i.e., the cover 25 is secured in the axial direction. The outer surface 45 of the locking part 41 is guided in axially displaceable fashion along the inner surface 44 of the cover 25. Elastic legs 46 of the locking part protrude through corresponding openings 48 in the side walls 47 of the cover 25. Consequently, a relative movement between the cover and the locking part 41 is at least impaired due to the frictional force.

The elastic legs 46 engage behind the radially inward directed, circumferential projection 50 at the elevation of the openings 48 and consequently hold the locking part 41 that is pressed upward by the inner spring 42 in FIG. 8 in contact with the circumferential projection 50 of the inner wall 22.

In this case, the lower end of the inner spring 42 does not directly act upon an associated edge of the switch housing 2, but rather on an annular support surface 52. Consequently, the force of the spring presses the base of the groove 32 against the circumferential projection 50 of the wall 42 and holds both components such that they are elastically engaged.

FIG. 7 also shows radially protruding limit stops 54 that prevent a pivoting movement of the elastic legs 46 while the locking part 41 is turned relative to the switch housing 2. This measure simultaneously blocks the rotational movement of the cover 25 relative to the switch housing 2 because the cover 25 and the locking part 41 cannot be turned relative to one another as described previously.

Figure 9:
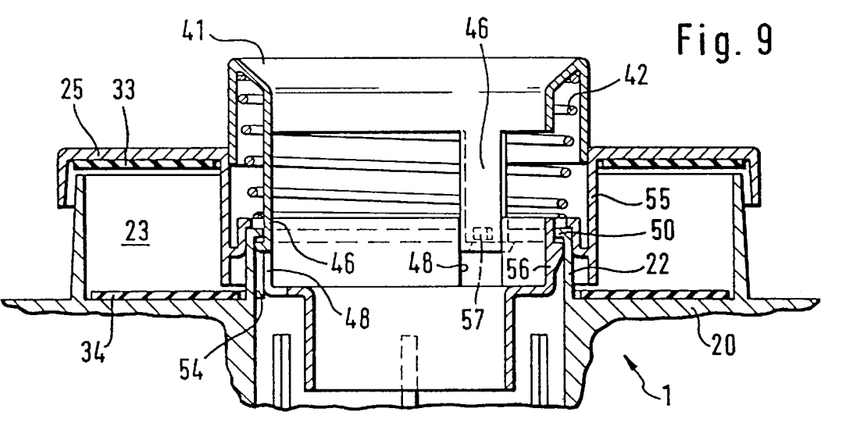
FIG. 9 is a section through part of the switch according to FIG. 8.

FIG. 9 shows a different view of the switch 1 in the position shown in FIG. 8. In this case, a limit stop 54 is provided on the inner wall of the switch housing. This limit stop is situated in the opening 48 of the cover 25 which is adjoined by a projection on the elastic leg 46 of the locking part 41 that protrudes through the opening 48.

Figure 10:
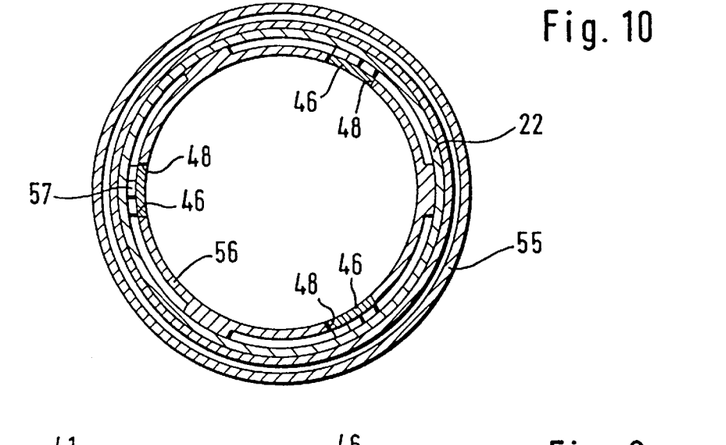
FIG. 10 is a schematic cross section through the switch according to FIG. 9.

FIG. 10 shows a section through the cover at the approximate elevation at which the cover adjoins the wall 22. One can easily identify the inner circumferential chamber wall 55 of the cover 25 and the inner side wall 56 of the groove 32. FIG. 10 additionally shows openings 48, through which the elastic legs 46 of the locking part 41 protrude. It was already described previously that the lateral surfaces of the catch projections 57 on the ends of the elastic legs 46 limit the rotational movement of the locking part 41 in cooperation with the limit stops 54 on the switch housing.

The figures show quite clearly that the locking part can be displaced inward against the force of the inner spring 42 during the assembly of the cover chamber 23 such that the catch projections 57 of the elastic legs 46 engage behind the circumferential projection 50 on the inner well 22 and simultaneously prevent a rotational movement of the locking part and consequently the cover 25 due to the limit stops 54.

Figure 11:
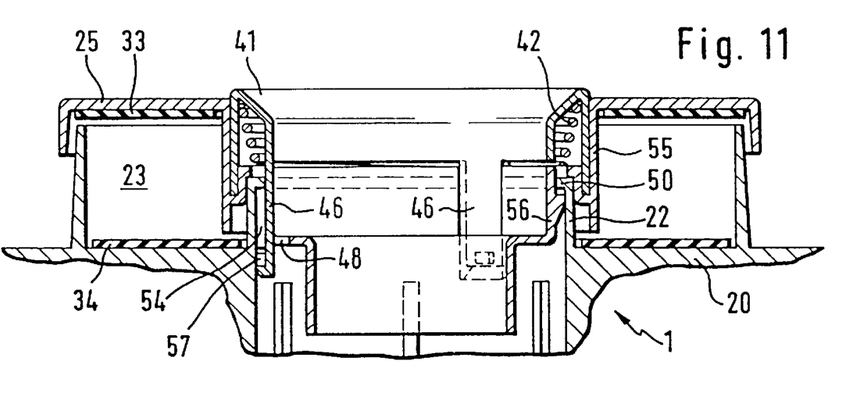
FIG. 11 is the switch according to FIG. 8 in the unlocked state.

FIG. 11 shows the possibility of moving the locking part 41 from the nonrotatable position according to FIG. 9 into a rotatable position by displacing the locking part along its longitudinal direction into the housing of the switch 1. This displacement can be realized by attaching the steering wheel to the steering column, with the steering column switch being rigidly connected to the steering column housing. Consequently, the operational state or installation condition of the steering column switch is characterized by the fact that the locking part is, as shown in FIG. 11, pushed inward while the catch projections 57 on the elastic legs 46 are displaced downward and disengaged from the limit stops 54.

We claim:

1. A steering column switch assembly for motor vehicles comprising:

a switch housing including a cover part, the cover part having a central opening for a steering column; and a spiral spring housing including a first cylindrical wall, said first cylindrical wall being integrally formed into the cover part of said switch housing such that a longitudinal axis of the first cylindrical wall is coincident with a longitudinal axis of the central opening, wherein the first cylindrical wall forms an outer wall of a receptacle adapted to accommodate a spiral spring.

2. The steering column switch assembly as claimed in claim 1, further comprising a spiral spring cover that is rotatably engaged with the cover part of the switch housing and has an annular hollow space that can hold the spiral spring.

3. The steering column switch assembly as claimed in claim 2 wherein the switch housing has a second cylindrical wall integrally formed into said cover part and arranged coaxially to the first cylindrical wall with the edge of the second cylindrical wall extending longitudinally away from the central opening, wherein said second cylindrical wall forms an inner wall of said receptacle adapted to accommodate the spiral spring.

4. The steering column switch assembly as claimed in claim 2 wherein the spiral spring cover has a circumferential groove with said spiral spring cover being rotatably guided on a circumferential edge of the switch housing disposed within the circumferential groove.

5. The steering column switch assembly as claimed in claim 2 wherein at least one dampening disc is disposed in the annular hollow space formed by the spiral spring cover.

6. The steering column switch assembly as claimed in claim 1, further comprising:

a spiral spring cover that forms an annular cover chamber in conjunction with the first cylindrical wall, wherein the spiral spring cover is arranged so that it can be turned relative to the switch housing; and a locking part disposed within an annular hollow space of the spiral spring cover and engaged with the switch housing, wherein the locking part is arranged so that it can be displaced in the axial direction of the central opening to lock the spiral spring cover relative to the switch housing.

7. The steering column switch assembly as claimed in claim 6 wherein the locking part is disposed in one of the switch housing and the spiral spring cover for displacement in the axial direction of the central opening, and wherein the steering column switch assembly further comprises an inner spring that is supported on the locking part on one end and is supported directly on the switch housing on another end such that the locking part is pulled away from the switch housing and into the locking position.

8. The steering column switch assembly as claimed in claim 7 wherein the inner spring is supported on the the spiral spring cover.

9. The steering column switch assembly as claimed in claim 8 wherein the inner spring engages with the spiral spring cover at an elevation approximately that of a rotatable bearing to hold the spiral spring cover in elastic contact with the switch housing.

10. The steering column switch assembly as claimed in claim 6 wherein an end of the locking part that protrudes into the switch housing has elastic legs and engages a circumferential projection of the switch housing responsive to an outward bias of an inner spring, with the spiral spring cover being secured by being turned around the longitudinal axis of the central opening relative to the switch housing.

11. The steering column switch assembly as claimed in claim 6 wherein the locking part is fixed in a rotational direction relative to the spiral spring cover.

12. The steering column switch assembly as claimed in claim 11 wherein the locking part is latched to the switch housing and extends through corresponding openings in the spiral spring cover.

13. The steering column switch assembly as claimed in claim 6 wherein an end of the locking part is selectively axially displaced to a second position in which the locking part rotatably disengages from the switch housing in the axial direction of the central opening so that the locking part can be turned relative to the switch housing.

14. The steering column switch assembly as claimed in claim 6 wherein the locking part in a first position is prevented from rotating by guiding projections between limit stops that extend in the axial direction and radially protrude from the switch housing.

15. The steering column switch assembly as claimed in claim 14 wherein the locking part is configured to be inserted into the interior of the switch housing that catch projections on elastic legs of the locking part are positioned outside of the region in which they engage with the limit stops.

16. The steering column switch assembly as claimed in claim 6 wherein the locking part can engage with the spiral spring cover by elastic legs of the locking part.

* * * * *